United States Patent
Mühlberger et al.

(10) Patent No.: US 6,365,999 B1
(45) Date of Patent: Apr. 2, 2002

(54) STATOR MODULE FOR AN ELECTRIC MOTOR

(75) Inventors: Uwe Mühlberger; Wolfram Angerer; Stefan Koll, all of Heidenheim; Andreas Lange, Zang, all of (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 09/509,179

(22) PCT Filed: Jul. 8, 1999

(86) PCT No.: PCT/EP99/04807

§ 371 Date: Jul. 10, 2000

§ 102(e) Date: Jul. 10, 2000

(87) PCT Pub. No.: WO00/05804

PCT Pub. Date: Feb. 3, 2000

(30) Foreign Application Priority Data

Jul. 23, 1998 (DE) ......................................... 198 33 021
Jul. 23, 1998 (DE) ...................................... 298 13 023 U

(51) Int. Cl.⁷ .......................... H02K 1/12; H02K 21/12
(52) U.S. Cl. ....................... 310/254; 310/258; 310/259
(58) Field of Search ................................. 310/162, 163, 310/254, 258, 267, 268, 266, 91, 259, 89; 29/596–598

(56) References Cited

U.S. PATENT DOCUMENTS

| | | | | |
|---|---|---|---|---|
| 4,620,139 A | * | 10/1986 | Egami et al. ................. | 318/254 |
| 4,959,578 A | * | 9/1990 | Varga ........................... | 310/268 |
| 5,051,641 A | | 9/1991 | Weh ............................. | 310/163 |
| 5,592,039 A | * | 1/1997 | Guardiani .................... | 310/113 |
| 5,773,910 A | * | 6/1998 | Lange .......................... | 310/266 |
| 5,889,348 A | * | 3/1999 | Muhlberger et al. ........ | 310/218 |
| 5,982,073 A | * | 11/1999 | Lashmore et al. ........... | 310/254 |
| 6,140,726 A | * | 10/2000 | Suzuki et al. ................ | 310/89 |

FOREIGN PATENT DOCUMENTS

| | | |
|---|---|---|
| DE | 35 36 538 | 10/1986 |
| DE | 37 05 089 | 3/1987 |
| DE | 38 21 660 | 6/1988 |
| DE | 39 04 516 | 2/1989 |
| DE | 40 34 703 | 10/1990 |
| DE | 41 25 779 | 8/1991 |
| DE | 43 14 513 | 5/1993 |
| DE | 43 28 774 | 8/1993 |
| GB | 2231207 | 11/1990 |

* cited by examiner

Primary Examiner—Tran Nguyen
(74) Attorney, Agent, or Firm—Ohlandt, Greeley, Ruggiero & Perle, LLP

(57) ABSTRACT

The invention relates to a stator module for an electric motor, especially an electric motor with transverse flux, comprising at least one stator unit that consists of at least one armature winding and which, when mounted, is associated with a rotor, whereby an interferric space is created in a radial direction in relation to the axis of symmetry of the electric motor. The invention is characterized by the following features: the stator unit comprises at least one return element that is made of a pressed material produced by means of powder metallurgy and which comprises a peripheral surface extending in a peripheral direction; two soft iron units which can be formed from tooth elements are associated with the return element, whereby substantially U-shaped cross-sectional surfaces, when seen from an axial viewpoint, are formed and the tooth elements of the individual soft iron units form the limbs of the cross-sectional surfaces; the position of the armature winding is defined by the peripheral surface of the return element, oriented towards the rotor and the self-oriented front faces of the soft iron units.

18 Claims, 3 Drawing Sheets

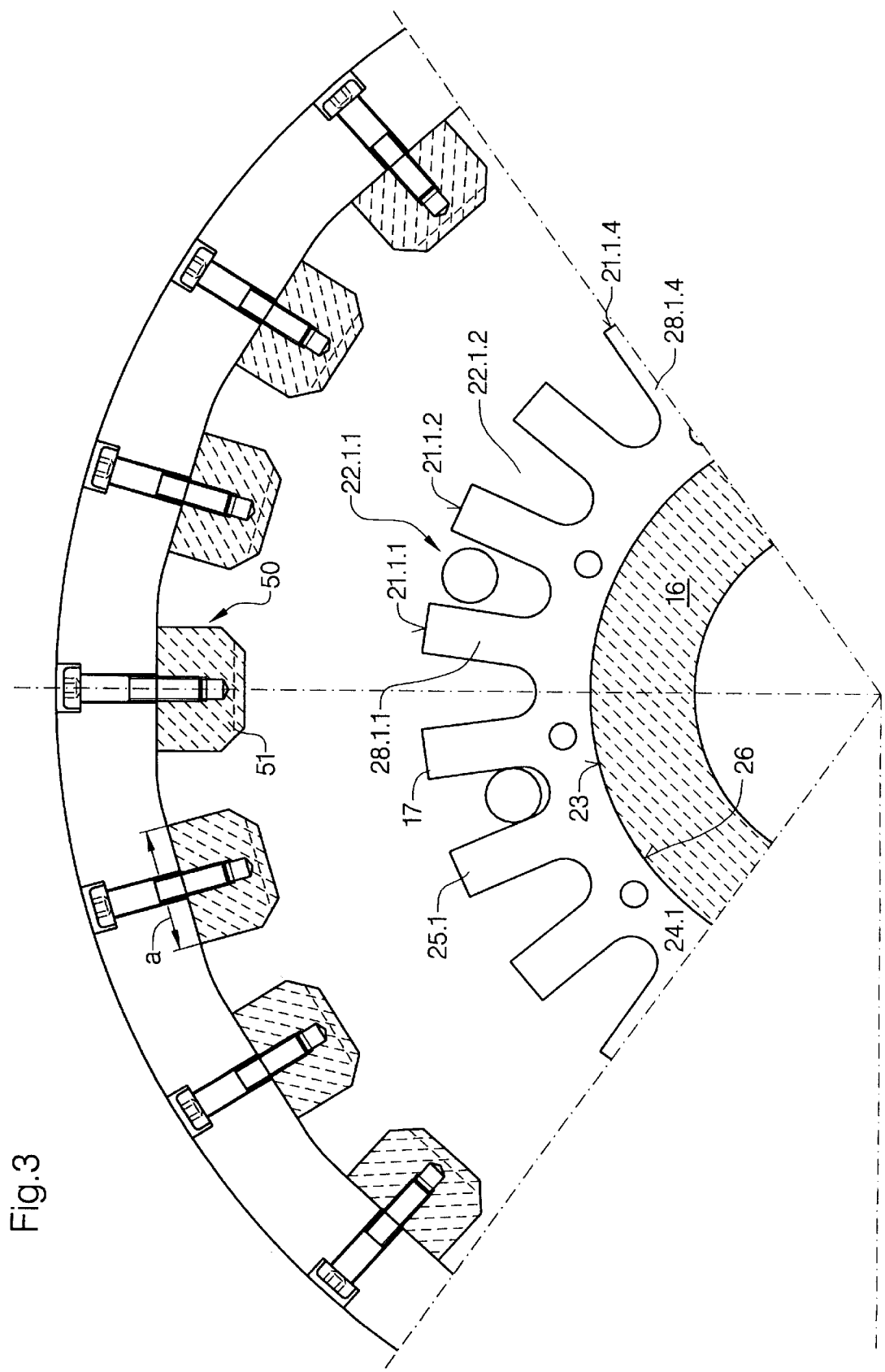

STATOR MODULE FOR AN ELECTRIC MOTOR

BACKGROUND OF THE INVENTION

1. Field of the Invention

The invention concerns a stator structural unit for an electrical machine, particularly an alternating-current machine [a. c. generator] in the form of a transverse-flux machine.

2. Description of the Prior Art

Electrical machines in the form of a. c. generators, particularly transverse-flux machines, are known in various embodiments from a multiple number of publications. In this connection, refer to the publications:

1. DE 3,536,538 A1
2. DE 3,705,089 C1
3. DE 3,904,516 C1
4. DE 4,125,779 C1

These essentially describe the basic principle and the construction of a. c. generators operating according to the transverse-flux principle. The machines comprise at least one stator structural unit with one stator, particularly comprising a multiple number of strip-wound cut cores, with at least one armature winding and a rotor with magnetic excitation arranged lying opposite the winding. The known stator structural units thus have a stator housing with cross-pieces and with so-called digits for fixation and heat discharge at the strip-wound cut cores of the outer and inner stators, as well as a support for the centering of the armature winding. The outer strip-wound cut cores, i.e., those strip-wound cut cores of the outer stator, are fixed in the radial direction between the cross-pieces by means of adjusting screws and retaining clips, or, in other known designs, are fixed roughly radially by means of a retaining ring of nonconducting material. The strip-wound cut cores of the inner stator are roughly radially fixed between the digits of the stator housing in the peripheral direction and through the coil. For final fixation, the stator which has been premounted with a suitable casting compound and with the use of a so-called core ring, is cast. The casting of the stator unit is a very time-consuming process, due to the very complicated housing structure. So-called winding and impregnating devices are necessary for production of exciting coils. Due to the multiple number of individual parts and their complex configuration, assembly is very time-consuming, particularly of the strip-wound cut cores at the outer stator with fastening clips. By analogy, this holds true also for the strip-wound cut cores contained in the inner stator. Another essential disadvantage in the production of the stator structural unit comprises the fact that the exciting coil and the strip-wound cut cores must be cast in the stator housing, and a post-processing of the casting compound is usually always necessary. The casting compound in turn limits the admissible maximum temperature of the entire structural unit to a specific value during operation. This in turn acts negatively on the obtainable permissible continuous output. Production itself requires expensive configured tools as well as highly qualified employees for assembling.

Therefore the object of the invention is to further develop a stator structural unit of the type named initially for an a. c. generator, particularly a transverse-flux machine, such that the named disadvantages are avoided. Taken individually, the stator structural unit will have a simple structural design, which assures a cost-favorable production and easy assembly. An adverse effect on the properties with respect to heat discharge is to be avoided.

BRIEF SUMMARY OF THE INVENTION

It is provided according to the invention to design stator structural units for electrical machines, particularly transverse-flux machines, with at least one stator unit bearing an armature winding, which forms an air gap with a rotor in the installed position, considered in the radial direction in axial section, of at least one electrical ground element configured preferably in annular form extending annularly in the peripheral direction considered in the installed position and tooth elements which can form a structural unit with the ground element. The annular electrical ground element is produced by powder metallurgy or manufactured from a component that has been produced by powder metallurgy. The tooth elements are comprised of a soft magnetic material or substance. The tooth elements can thus be coupled with the annular ground element such that the tooth elements, considered in an axial section of the electrical machine, and together with the annular ground element, describe an essentially U-shaped cross-sectional surface, whereby the two legs of the U-shaped section are each formed of tooth elements. Tooth elements in the installed position are to be understood as projections extending to the rotor, which form edges or edge surfaces in the peripheral direction, whereby the two edges pointing together in the peripheral direction describe two stator tooth gaps in the peripheral direction of adjacent tooth elements.

A plurality of tooth elements, which lie on a common diameter with respect to the axis of symmetry of the electrical machine, in the axial direction and considered in axial section, or which can be described by projecting onto the axis of symmetry through a common point on the latter, form a so-called soft-iron unit. In order to produce a U-shaped cross section, the ground element is coupled with two soft-iron units.

Preferably star-shaped soft-iron elements are designed in the peripheral direction such that they have a multiple number of individual projections extending away from the annular ground element in the direction of the rotor and describing the tooth elements. The soft-iron units describing the tooth elements in the peripheral direction are arranged at specific distances from one another, depending on the configuration of the rotor. Preferably, the projections forming the tooth elements are combined with the annular ground element, particularly joined in a radial manner, by means of a common base unit extending in the peripheral direction, with which the latter preferably form a structural unit.

The tooth elements or the soft-iron units formed from these elements, particularly two tooth elements each time, form the U legs of the stator unit extending away from the annular ground element each time, viewed in an axial section. The tooth elements of a soft-iron unit can thus be coupled each time individually in a frictional connection and/or form-fitting manner with the electrical ground element. Preferably, however, the soft-iron units are designed each time as annular elements or the individual tooth elements are carried by a common base unit. In order to avoid circular currents, the annular elements are designed so that they are interrupted in the peripheral direction, at least at one place. The subdividing into a multiple number of segments, whereby each segment contains a multiple number of tooth elements, is also conceivable. The coupling or combining of the soft-iron units with the annular electrical ground element can be designed in different ways. Connections are thus conceivable by means of:

a) frictional connection
b) form-fitting connection
c) frictional and form-fitting connection.

In designs with frictional connection, preferably the soft-iron units are assembled with the annular ground element by means of a press connection. This offers the advantage that there is no dependence of service life on the composite materials used, since there is no pure material connection. The concrete configuration of the press connection can be produced in different ways. Selection can be made according to the opinion of the competent person skilled in the art.

The basic possibility for the configuration of elements of electrical machines from or as powder-metallurgically produced parts is already known from the publication "Composites pave the way to the electrical machine designs of the future" (Höganäs Iron Powder Information PM 95-4). These involve, however, the complete design of elements from such materials. The inventors have recognized the fact that the gross transfer of this possibility to transverse-flux machines does not offer the desired advantages and thus searched for more suitable designs producing improved results.

The electrical ground element extending in an annular manner in the peripheral direction, considered in the peripheral direction, can be designed as
a) one part or
b) several parts.

In the design according to variant b), the annular contour is fixed by attaching the element parts of the ground element to the housing in the peripheral direction.

The stator unit bearing the winding of the ground element and soft-iron units or tooth elements can be offered as a compact and already pre-assembled basic structural unit and can be integrated into the stator structural unit, particularly the stator housing. The number of structural elements to be fixed opposite one another in the axial and radial directions is relatively small, and fixation is done on the basis of the design of the stator structural unit. The armature winding is arranged between the soft-iron units. The entire unit including the armature winding can be impregnated with an insulating agent, for example, an insulating resin. The part of the stator unit comprised of material produced by powder metallurgy offers the advantage of isotropic, magnetic and electrical properties. Depending on the stator construction, this region is only necessary as the ground region for the magnetic flux between the soft-iron units or the tooth elements forming these units. The poorer permeability in this region, which is caused by the material properties, is acceptable, due to the enlarged flow cross-section opposite the tooth elements.

The use of the annular ground element in the described manner offers the advantage of creating a compact stator component with improved strength, which can be easily manufactured, and has optimal electrical and magnetic properties.

In a preferred embodiment, the soft-iron units or the tooth elements forming these units are a bundle of laminations layered in the axial direction, which comprise annular elements of correspondingly stamped-out sheet metal layered one behind the other, considered in the axial section in the installed position. Considered in the peripheral direction, each individual annular sheet metal element and thus each bundle of laminations has open-edge recesses in the region of the peripheral surface aligned to the rotor, for the formation of the projections describing the tooth elements. These open-edge recesses are arranged distributed over the periphery of each individual annularly shaped sheet-metal element and thus also the bundle of laminations at uniform distances. The annular configured sheet-metal elements and thus each bundle of laminations describes an essentially star-shaped contour considered in the installed position in the peripheral direction. The number of annular individual sheet-metal elements layered on top of one another or arranged behind one another in the axial direction in the installed position depends on the design of the entire electrical machine. The representation of the soft-iron elements as a bundle of laminations assures a good permeability in the tooth region and minimizes the eddy current losses that occur.

Preferably, in the case of transverse-flux machines, the stator unit bearing the armature winding, particularly the stator part, is formed by an inner stator of a transverse-flux machine. This offers the advantage of screwing into the stator housing the inner stator, or at least the stator unit assigned to one pole structure of the rotor, as a completely pre-assembled structural group comprised of the annular ground element and the tooth elements forming the soft-iron units. In the case of a symmetrically constructed transverse-flux machine, the rotor generally has two pole structures, each extending away from a central carrier disk and the pole structures each belong to one electrical phase. Accordingly, the corresponding stator unit can also be assigned to each pole structure. The total structural unit of the stator in this case is comprised of at least two stator units configured according to the invention, which function as an inner stator and are assigned to the rotor, particularly to [each of] the pole structures on both sides of the carrier disk. The connection between stator housing and inner stator thus is made in the region of the annular ground element, since this can be produced simply without great expenditure in this region. However, configurations of transverse-flux machines with two stator units bearing an armature winding, which can be assigned in the radial direction on both sides of one pole structure and in which the outer stator is prefabricated also as a pre-assembled structural unit in the described manner, are also conceivable. Another, third possibility consists of designing only the outer stator as the component bearing the armature winding.

In the case of symmetrical constructed transverse-flux machines with a rotor with two pole structures, at least
a) two stator units configured according to the invention are provided as the total structural unit [of the] inner stator, and/or
b) two stator units configured according to the invention are provided as the total structural unit [of the] outer stator, each of which form an air gap with the rotor in the radial direction and are integrated in the stator housing or are fastened to it.

In designing a transverse-flux machine with at least one stator unit bearing the armature winding in the form of the inner stator, preferably the outer stator is designed of a multiple number of individual stator elements, which are comprised of materials produced by powder metallurgy and compacted, as a solid-profile structural part, which [elements] can be attached directly to the stator housing with simple fastening elements. Preferably, attachment is made by means of screw elements. In order to be able to use solid parts that are configured as simply as possible and that are easy to assemble, which can be used as a standard type in different machine designs, these have an essentially planar-shaped stop surface in the region of their contact surface with the inner surface of housing 5. Correspondingly, the front surface of the housing turned toward the rotor in the installed position also is preferably designed with planar stop surfaces running in the axial direction. To guide the connection elements, passage openings are provided on housing 5, which can be furnished with a thread and threads can be provided in the stator elements.

The configuration of a stator unit bearing the armature winding according to the invention offers considerable functional advantages in addition to a number of cost and manufacturing advantages. In particular, an improved heat discharge into the water-cooled stator housing can be made possible by the configuration of the inner stator element designed in combination with the simplified configuration of the outer stator. As a consequence of the frictional connection, which makes possible avoiding the use of casting compounds for radial and axial fixation of the stator unit, in particular, the armature winding can be cooled directly, for example, by cooling with the oil mist produced by means of rotor rotation. In addition, an increase in the admissible continuous output by approximately 25% is to be expected by avoiding casting compounds, since the admissible maximum temperature during operation is no longer limited by the casting compound.

The stator housing itself can be constructed in a very simple manner; in particular, slots are no longer necessary for taking up strip-wound cut cores. Winding and impregnating devices for producing the armature coil as well as the means for binding the components are no longer necessary. The previously time-consuming assembly of the outer strip-wound cut cores with fastening clips is reduced to simple screwing in of powder [metallurgy] elements comprising soft magnetic material. The stator unit configured according to the invention, independent of whether it is designed as an outer or inner stator, can be supplied as a pre-assembled, prefabricated structural unit. A casting of the armature coil and the strip-wound cut cores in the stator, which was necessary earlier, can be dispensed with, whereby the necessary subsequent post-processing will also be avoided. In addition, no complicated tools and no special know-how of the employees that are entrusted with it are necessary for producing the individual elements and for assembling these.

The solution according to the invention is explained in the following on the basis of figures. Individually, the following is represented therein:

BRIEF DESCRIPTION OF THE DRAWING

FIG. 3 illustrates a view along A—A of FIG. 1.

DESCRIPTION OF THE INVENTION

Figure 1:
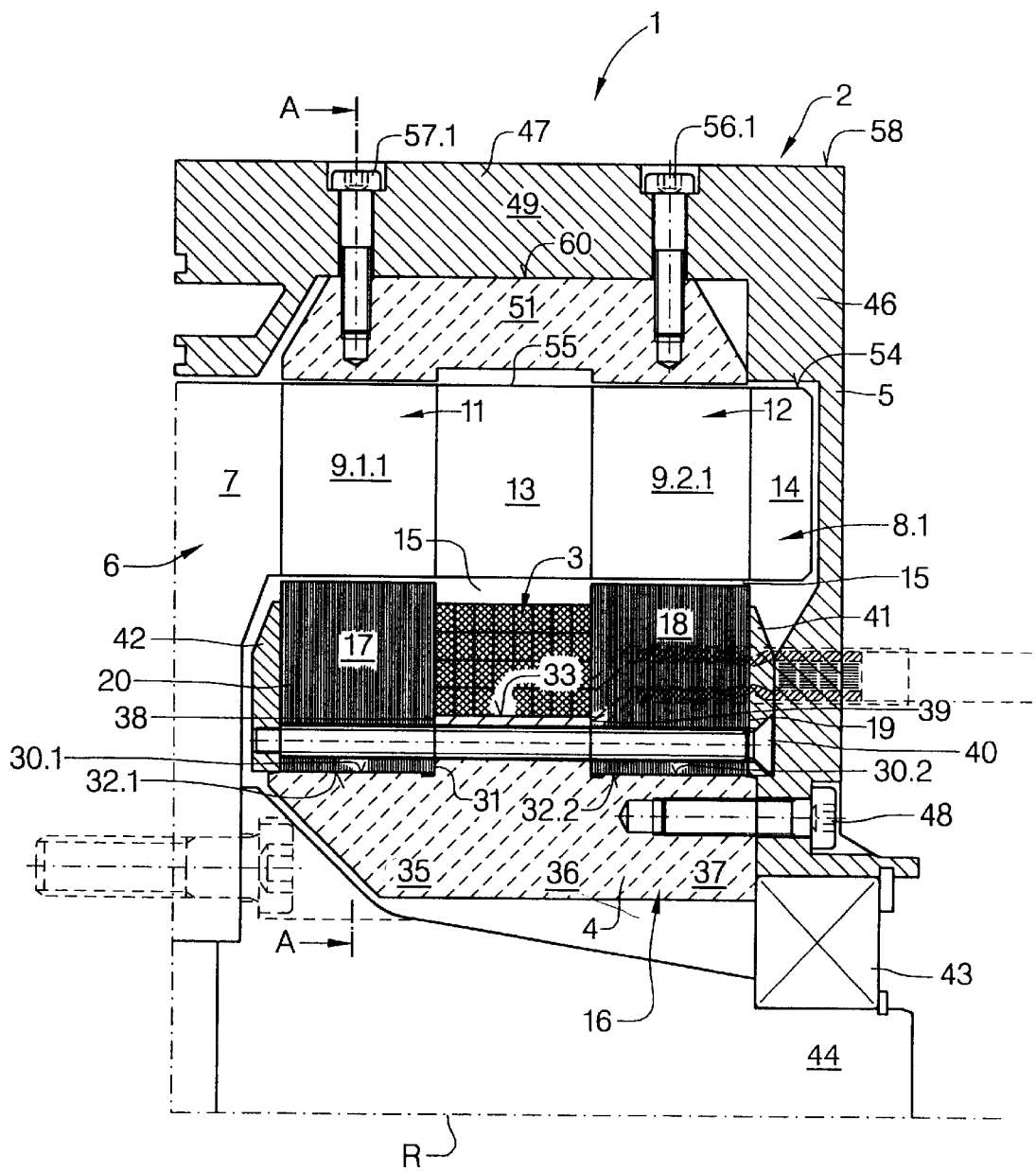
FIG. 1 shows the application of a stator unit configured according to the invention in the form of an inner stator for a transverse-flux machine.

FIG. 1 illustrates the structure of a stator structural unit 2 configured according to the invention on the basis of an excerpt from an axial section of an electrical machine 1 in the form of a transverse-flux machine. Stator structural unit 2 has at least one stator unit 4 bearing at least one armature winding 3. The stator unit 4 bearing the armature winding 3 is here designed as an element of the entire structural unit of the inner stator. Stator unit 4 is arranged in a stator housing 5. In the case that is shown, stator structural unit 2 comprises an inner stator of two stator units, whereby only the stator unit assigned to one pole structure of the rotor is shown as a representative excerpt for purposes of illustration. A rotor 6 of electrical machine 1 is mounted so that it can be rotated in housing 5. In the known way, the rotor is comprised of a central carrier disk 7, on the radial outer end region of which, for example, two pole structures, pole structure 8.1 and pole structure 8.2, which is not shown here on one side, are arranged symmetrically on both sides, coaxial to the axis of rotation or rotational axis R of rotor 6, which also functions as the axis of symmetry of the electrical machine. These pole structures each comprise permanent magnets $9.1.1-9.1n$ and $9.2.1-9.2n$, which are alternately polarized and lie next to each other in two rows in the peripheral direction and rotor soft-iron elements $10.1.1-10.1n$ and $10.2.1-10.2n$ are arranged adjacent. The two rings are designated here 11 and 12. The rings of the permanent magnets 9 arranged behind one another alternately in the peripheral direction and rotor soft-iron elements 10 are separated from one another by annular intermediate elements of magnetically and electrically non-conducting material. For the pole structure 8.1, this is at least ring 13. Also, the carrier disk and an end piece 14 limiting the pole structure in the axial direction are produced of electrically and magnetically non-conducting material. Preferably, plastic is used for this purpose. Pole structure 8.1 is separated opposite stator unit 4 by means of an air gap 15. Stator unit 4 forms the radially inner-lying inner stator or the part of the entire structural unit [of the] inner stator assigned to pole structure 8.1. Stator unit 4 describes an essentially U-shaped configured cross-sectional surface in a view in axial section of the electrical machine according to FIG. 1. Stator unit 4 comprises for this purpose at least one annular ground element 16, which forms a structural unit with two soft-iron units 17 and 18 formed from a multiple number of tooth elements. The term "soft-iron units" thus stands for elements of soft-magnetic materials. Soft-iron units 17 and 18 are constructed such that they form two legs [of the U] of stator unit 4 considered in cross section in the axial section according to FIG. 1. These [legs]are designated here by 19 and 20. In the functional position, legs 19 and 20 face the permanent magnets 9 of the pole structure 8.1 of rotor 6; individually leg 20 faces magnets $9.1.1-9.1n$ and leg 19 faces magnets $9.2.1-9.2n$. The armature winding 3 running in the peripheral direction is found inside legs 19 and 20, closed on three sides. The soft-iron units 17 and 18 are designed in peripheral direction as shown in FIG. 3, such that they are subdivided in the peripheral direction at the peripheral surfaces 21.1 or 21.2 aligned to air gap 15 or to rotor 6 in partial surface elements $21.1.1-21.1n$ or $21.2.1-21.2n$, which are arranged at distances from one another in the peripheral direction with a distribution in specific ratio to the pole pitch T at the rotor. In order to produce a simple assembly, soft-iron units 17 and 18 are designed in the form of annular elements. Preferably, the soft-iron units 17 or 18 are designed as axially layered bundles of laminations. Each soft-iron unit of one stator unit comprises a multiple number of annular elements of sheet-metal plates that are stamped out and arranged behind one another in the axial direction. The distance between outer surfaces $21.1.1-21.1n$ and $21.2.1-21.2n$ with a specific distribution relative to one another is realized by designing or forming open-edge slots $22.1.1$ to $22.1n$ and $22.2.1$ to $22.2n$. Open-edge slots $22.1.1-22.1n$ and $22.2.1-22.2n$ are thus extended from the region of outer periphery 21.1 or 21.2 in the radial direction to the surface of annular element 16 pointing to rotor 6. In addition, the open-edge slots are designed in the axial direction coaxial to the axis of rotation R of the rotor. The openings always point to the air gap or rotor 6. At least annular element 16 is produced by powder metallurgy. A metal powder is used as the base material. The powders are then pressed into so-called green compacts.

These are either pressed cold or under an elevated temperature effect in order to produce specific properties. A post-treatment can be performed.

Considered in the peripheral direction, soft-iron units 17 or 18, each formed from individual tooth elements, have at least two partial regions in the radial direction, a first partial region 24.1 or 24.2 and a second partial region 25.1 or 25.2. The first partial region 24.1 or 24.2 is provided for coupling with the annular ground element 16 and is also designed as an annular element. The coupling with the annular ground element 16 is produced in the region of front side 26 of soft-iron unit 17, or 27 of soft-iron unit 18, which is turned away from rotor 6 in the installed position. The second partial region 25.1 or 25.2 is thus formed of a multiple number of projections describing individual tooth elements, which are denoted by 28.1.1–28.1n for soft-iron unit 17, and which are distanced from one another, preferably with a specific pole pitch with respect to the arrangement of the permanent magnets at the rotor, considered in the peripheral direction. The individual tooth elements 28.1.1–28.1n are designed as a structural unit with the first partial region 24.1 in the case of the design of the soft-iron units of stamped sheet-metal elements. The individual tooth elements 28.1.1–28.1n to 28.2.1–28.2n are then shaped as projections.

There are many possibilities for the coupling between soft-iron units 17 or 18 and annular element 16, which functions as a so-called ground ring in the functional state and mechanically conducts the function of a support member. Preferably, a frictional coupling between annular element 16 and the individual elements of the soft-iron unit 17 formed from a multiple number of tooth elements is undertaken for the design of soft-iron unit 17 from soft-iron bundles of laminations in slotted design. This can be produced in the simplest case by a press connection. In this case, the individual elements of stator unit 4, annular ground element 16 and soft-iron unit 17 or 18 are to be designed with respect to their dimensions such that these are specifically adapted to one another. Individually, this concerns at least the surface regions 30.1 or 30.2 entering into effective connection with one another, which are formed on the front side 31 of annular element 16 aligned to rotor 6, and surfaces 32.1 or 32.2 on soft-iron units 17 or 18 entering into effective connection with ground element 16, whereby surfaces 32.1 and 32.2 are each formed by peripheral surfaces 26 or 27 directed away from rotor 6 in the incorporated position.

Other possibilities for the coupling between soft-iron unit 17 or 18 and annular ground element 16 in the radial direction are comprised of form-fitting connections or combinations of form-fitting and frictional connections. It is conceivable, for example, to provide soft-iron units 17 or 18 with appropriate projections for this purpose, which can be introduced into projections at the annular element that are designed complementary to these, and can be connected with the latter in form-fitting manner, for example, by means of a snap connection. Individually, a multiple number of possible embodiments are conceivable; however, we will not enter into the individual cases here, since the possibilities are part of the knowledge of fundamental concepts of the competent person skilled in the art in the field of application of the invention.

The armature winding 3, which is arranged between the two legs 20 or 19 formed by soft-iron units 17 or 18, is directly wound onto the region of front side 31 of annular element 16 free of partial surfaces 30.1 and 30.2. The armature winding 3 in the axial direction is fixed by the design of soft-iron unit 17 or 18 made as a structural unit in the peripheral direction. Fixation in the radial direction is produced by the design of the inner stator as a stator unit bearing a winding by the tension produced in the winding. The armature winding 3 thus lies directly on the partial surface 33 of the front side 31 of annular ground element 16 aligned toward the rotor. For precise fixation of the position of the soft-iron elements in the axial direction, in the installed position, the annular ground element is preferably subdivided into three partial segments, a first partial segment 35, a second partial segment 36, and a third partial segment 37. Partial segment 36 thus forms a stop 38 for soft-iron unit 17 and a stop 39 for soft-iron unit 18 each time with partial segment 35 and partial segment 37 in the axial direction. Partial element 35 thus bears partial surface 30.1, partial element 37 bears partial surface 30.2, while partial element 36 bears partial surface 33. In the simplest case, the individual partial surfaces 30.1, 30.2 or 33 and thus the partial elements 35, 37 or 36 are formed by forming the annular element with different outer diameter.

In this view, the design of the inner stator, considered in the cross section corresponding to FIG. 1, does not in any way differ from the stator form already known from the prior art. The magnetic flux guide is also the same.

Inner stator structural unit 4, which is comprised of annular element 16, soft-iron units 17 and 18 and the armature winding, can be offered as a completely pre-assembled structural unit. Preferably, additional connection elements are provided for bracing stator structural unit 4 in the axial direction. In this case, by way of representation, a fastening element 40, which comprises a first stop element 41, which is assigned to soft-iron unit 18 in the axial direction and limits its movability in the axial direction is coupled or connected in a form-fitting manner and by a frictional connection with a second stop element 42, which is assigned to the other soft-iron unit 17. Fastening element 40 thus extends through soft-iron units 18 and 17 as well as, in part, the annular ground element 16, particularly in the region of the second partial element 36. The axial bracing is produced by the prestressing necessary for the torque on the inner stator or stator unit 4.

Figure 2:
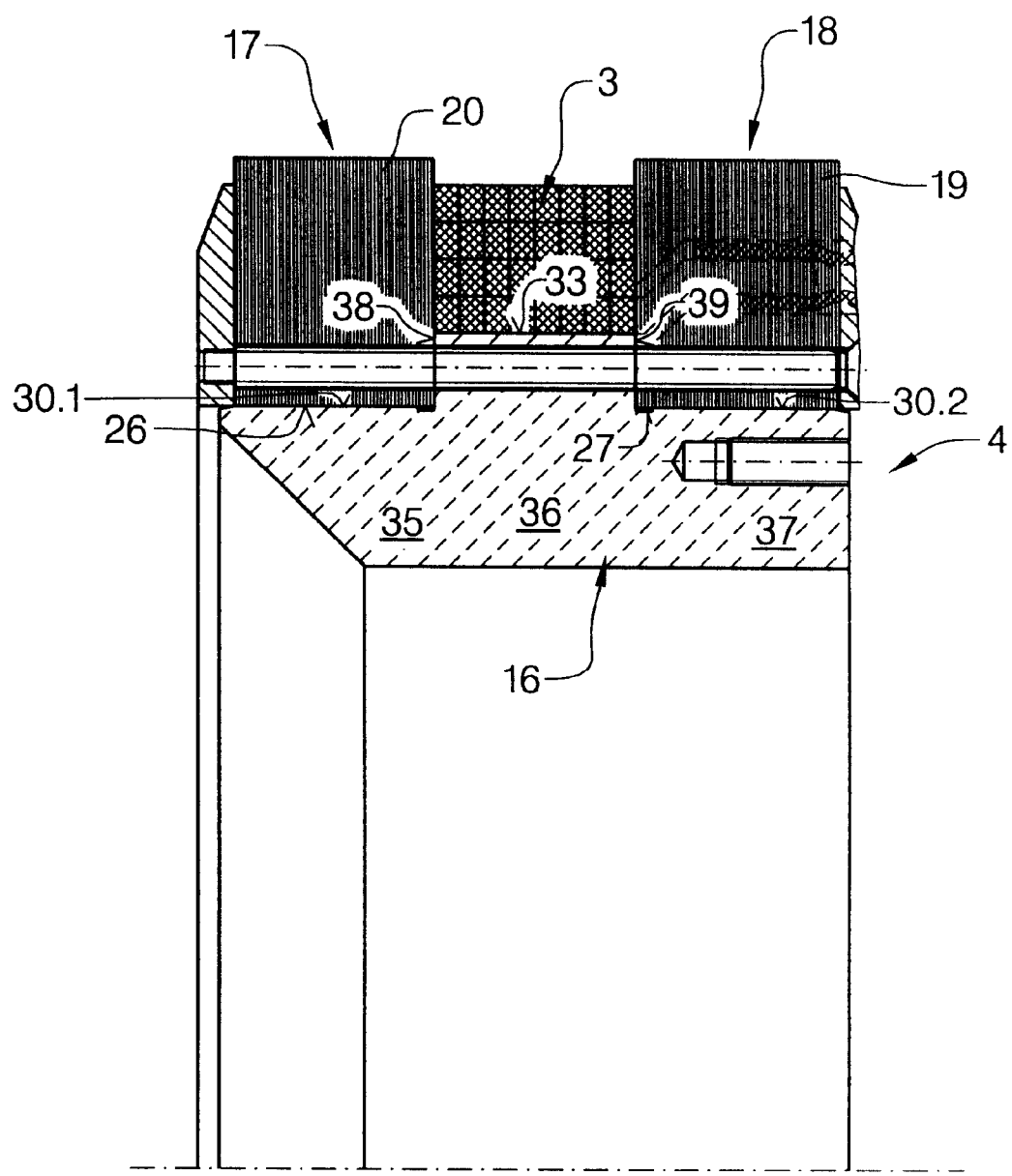
FIG. 2 illustrates, in an enlarged representation, a stator structural unit according to FIG. 1 that is configured according to the invention and is pre-assembled

FIGS. 1 to 3 illustrate the design of the stator unit bearing the winding according to the invention on the example of an excerpt from an inner stator of a transverse-flux machine. This design represents a preferred application of the basic concept according to the invention, but will not be limited to design as an inner stator. The design of the basic concept of the invention can also be used for the outer stator. Preferably, the above-described solution, however, is applied only for the inner stator, since the design as an outer stator has larger pole gaps in the peripheral direction, and these in turn cause increased losses, which are reflected in a reduction of the total efficiency of electrical machine 1.

The stator unit 4, which is shown in FIGS. 1 and 2 and which functions as the inner stator in the installed position, is integrated into stator housing 5. Stator housing 5 is thus, for example, mounted onto rotor shaft 44 of the rotor 6 by means of a bearing arrangement 43. Preferably, stator housing 5 has a front wall 46 running in the radial direction and an annular housing element 47 extending in the axial direction, which together form a structural unit. However, designs of stator housing 5 comprised of at least two separate parts are also conceivable, whereby the front wall 46 running in the radial direction and annular housing element 47 form one structural unit and extend over a region that can be described by the radial axis of symmetry $S_R$ of rotor 6 and of element 14 on the front side, at least in the axial direction, considered in the installed position.

FIG. 1 shows a particularly preferred embodiment for the configuration of stator housing 5. Stator housing 5, comprised of front wall 46 and housing part 47 extending in the axial direction is designed as an integral structural part. The annular element of stator unit 4 is attached by means of at least one fastening element 48 to stator housing 5, particularly front wall 46 extending in the radial direction. Preferably, a multiple number of fastening elements 48 are provided, which are arranged on diameter d and are preferably arranged at the same distance relative to one another, considered in the peripheral direction of stator housing 5. Stator unit 4 is installed as a pre-assembled structural group comprised of soft-iron units 17, 18 and annular ground element 16, which is produced by powder metallurgy.

FIG. 2 illustrates the inner stator once more in the form of stator unit 4, on the basis of an excerpt from FIG. 1, in enlarged representation. Therefore, the same reference numbers are used for the same elements. Taken individually, FIG. 2 reproduces the pre-assembled stator unit 4, as it can be used for installation into stator housing 5.

After winding the armature coil 3, the inner stator itself or stator unit 4 can be impregnated with an insulating resin and, after drying, can be screwed into stator housing 5.

Stator structural unit 1 usually comprises, in addition, at least second stator unit 50, which functions as an outer stator. Stator unit 50 comprises a multiple number of individual stator elements 51 arranged behind one another in the peripheral direction, which [elements] also have an essentially U-shaped cross section in the axial section according to FIG. 1. Stator elements 51 form an air gap 55 with the outer surface 54 of rotor 6 in the installed position or in the assembled state of electrical machine 1. Stator unit 50 is preferably free of an armature winding.

Considered in the peripheral direction in the installed position, each individual stator element has a specific extention a. Individual stator element 51 is designed as an element with a widened back part, which is preferably produced by powder metallurgy and is pressed in one piece. The individual stator elements 51, which are designed as solid parts, are preferably joined together in a form-fitting manner and with frictional connection by means of connection elements 56.1 to 56.N or 57.1 to 57.N. Preferably, this connection is made by means of screw connections. The screw connections are guided from the outer surface 58 of annular housing part 47 through housing wall 49 of annular housing part 47 and brought into effective connection with corresponding counter-elements in the individual stator elements 51. Preferably, each individual stator element 51 has at least one thread worked into it for this purpose. The thread thus extends from the outer surface distant from the rotor and runs in the direction of rotor 6. Other easy-to-produce connections are also conceivable.

Preferably, both the individual stator elements 51 of stator unit 50 and the annular ground element 16 of stator unit 4 are produced from the same material. Preferably, an iron powder composite material is used for this purpose. The elements produced by powder metallurgy are independent with respect to the direction of the electrical and magnetic properties. In fact, they have a smaller permeability in comparison to conventionally used components of electric [magnetic steel] sheets, and this is positively expressed, of course, in the stator construction preferably used, as shown in FIG. 1. The magnetic flux is conducted in a transverse manner, just as before.

The annularly shaped ground element has at least one outer surface running in the peripheral direction. The inner contour need not be of annular configuration and can be designed in a flexible manner. The subdividing of the ground element into at least two partial elements in the peripheral direction is also conceivable, and these partial elements will be put together in the installed position, or describe the annular element in the peripheral direction by attachment onto the stator housing, whereby at least one interruption can be provided in the peripheral direction.

The design according to the invention has considerable advantages in its entirety relative to cost, production and function. Since the stator housing itself must be designed without the slots for the strip-wound cut cores known in the prior art, it can be very simply produced, for example as a cast part. Additional winding and impregnating devices for the coil production are not necessary, nor is a binding of the components. In addition, the assembly of the stator elements to the outer stator can be performed in an essentially simpler manner, since the time-consuming assembly of the outer strip-wound cut cores with attachment clips can be eliminated. Likewise for the inner strip-wound cut cores. The inner stator is simply screwed together with the armature coil as a complete unit. In addition, a casting of the coil and the strip-wound cut cores in the stator can also be eliminated, as well as the subsequent evacuating and post-processing and tempering of the casting compound.

In addition to the possible better heat discharge into a water-cooled stator housing, the armature coil can be cooled intensely by the oil mist, due to the omission of the casting compound. By omitting the casting compound, which previously also limited the admissible loadability with respect to temperature to a value of approximately 130° C., now the admissible limit can be set approximately 20° C. higher, so that the obtainable continuous output caused by the omission of the casting compound alone is increased by approximately 25%. By eliminating the devices that are no longer necessary for the attachment of the strip-wound cut cores or collector elements, expensive cores are not necessary in the production of the cast shape. In addition, a deburring of aluminum digits in the region of the coil attachment and support is no longer necessary. A simple assembly site is sufficient for producing the stator in the design described in FIG. 1, and a special know-how on the part of the assemblers is no longer necessary.

What is claimed is:

1. A stator structural unit for an electrical transverse-flux machine with at least one stator unit including at least one armature winding, wherein said stator unit forms an inner stator unit of said machine and, when in an installed position, is adjacent to a rotor with the formation of an air gap arranged in a radial direction on an axis of symmetry of the electrical machine; comprising:

the inner stator unit including at least one peripheral surface that runs in a circumferential direction, and that is formed of a ground element produced by powder metallurgy and fabricated from pressed material; and two soft-iron units that are formed from a plurality of tooth elements and that are adjacent to said ground element;

wherein said armature winding is bounded by a peripheral surface of said ground element, wherein said armature winding faces said rotor, wherein said armature winding faces a front side of each of said soft-iron units, wherein the front sides of said soft iron units face one another, wherein an outer stator is adjacent to said rotor with the formation of an air gap in the radial direction and comprises a multiple number of solid elements configured as U-shaped in cross section and arranged at predetermined distances to one another in the circumferential direction, said solid elements respectively include a plurality of complementary tooth elements, that are adjacent to said rotor in a corresponding complementary manner as said tooth elements of said inner stator units, and wherein said complementary tooth elements are produced by powder metallurgy and fabricated of pressed materials and are joined with a stator housing.

2. The stator structural unit according to claim 1, wherein said peripheral surface of the ground element is annular, wherein said plurality of tooth elements extend away from said peripheral surface, and wherein open-edge recesses are formed at predefined distances by said plurality of tooth elements.

3. The stator structural unit according to claim 1, wherein said ground element and said soft-iron units are coupled together in a form-fitting manner.

4. The stator structural unit according to claim 1, wherein said ground element and said soft-iron units are coupled together in a frictional connection.

5. The stator structural unit according to claim 4, wherein the frictional coupling is produced by means of a press connection.

6. The stator structural unit according to claim 1, wherein each of said soft-iron units comprises a multiple number of individual sheet-metal elements, that are arranged layered behind one another with a formation of a bundle of laminations, when in the installed position in axial section.

7. The stator structural unit according to claim 6, wherein each of said bundles of laminations is shaped annularly;
wherein each of said bundles of laminations has a basic unit running in said circumferential direction with projections formed by open-edge recesses in the region of peripheral surfaces said plurality of tooth elements pointing to said rotor in the installed position; and
wherein the open-edge recesses or the plurality of tooth elements are arranged at predetermined equivalent distances to one another in the circumferential direction.

8. The stator structural unit according to claim 1, wherein the ground element comprises a first partial segment, a second partial segment and a third partial segment;
wherein the two soft-iron units are assigned to the first and the third partial segments, respectively, and the armature winding is assigned to the second partial segment; and wherein the second partial segment has a different outer diameter compared with an outer diameter of either the first or the third partial segments, with the first, second and third partial segments forming at least one stop surface in the axial direction for each soft-iron unit.

9. The stator structural unit according to claim 1, wherein an end disk is assigned to each of said soft-iron units to limit motion thereof in the axial direction; and
wherein fastening means braces the tooth elements of said soft-iron units, said ground element and said end disks in the axial direction.

10. The stator structural unit according to claim 9, wherein the ground element includes two or more parts.

11. The stator structural unit according to claim 1, wherein said stator unit is connected with said stator housing in the region of said ground element.

12. The stator structural unit according to claim 11, wherein said stator housing comprises at least one housing part running in said circumferential direction and enclosing one of said rotor and said outer stator, said housing part being coupled with a front-side lateral part extending in the radial direction.

13. The stator structural unit according to claim 12, wherein said housing part is annular, and wherein said annular housing part and said front side lateral part form a structural unit.

14. The stator structural unit according to claim 1, wherein said rotor has a plurality of pole structures, wherein said at least one inner stator unit is one of two equally configured inner stator units, and wherein said two inner stator units are assigned to each of said pole structures of said rotor.

15. The stator structural unit according to claim 1, wherein each of said soft-iron units is subdivided in said circumferential direction.

16. The stator structural unit according to claim 1, wherein said complementary tooth elements are joined with said stator housing by means of one or more fastening elements.

17. The stator structural unit according to claim 16, wherein said fastening elements have screw connections.

18. The stator structure according to claim 1, wherein said outer stator is free of said armature winding.

* * * * *